United States Patent
Mirabeau et al.

(10) Patent No.: US 7,337,367 B2
(45) Date of Patent: Feb. 26, 2008

(54) MANAGEMENT OF MEMORY CONTROLLER RESET

(75) Inventors: Lucien Mirabeau, Tucson, AZ (US); Charles S Cardinell, Tucson, AZ (US); Man Wah Ma, Pleasanton, CA (US); Ricardo S Padilla, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 11/030,477

(22) Filed: Jan. 6, 2005

(65) Prior Publication Data

US 2006/0150030 A1    Jul. 6, 2006

(51) Int. Cl.
*G06F 11/00* (2006.01)

(52) U.S. Cl. .............. 714/41; 714/42; 714/43

(58) Field of Classification Search ............... None
See application file for complete search history.

(56) References Cited

U.S. PATENT DOCUMENTS

| | | | | |
|---|---|---|---|---|
| 5,291,494 A | * | 3/1994 | Bruckert et al. ............. | 714/24 |
| 5,519,715 A | * | 5/1996 | Hao et al. .................... | 714/727 |
| 6,161,208 A | * | 12/2000 | Dutton et al. ............... | 714/764 |
| 6,643,796 B1 | * | 11/2003 | Floyd et al. .................. | 714/10 |
| 7,117,320 B2 | * | 10/2006 | Ashmore et al. ............ | 711/156 |
| 2002/0010880 A1 | * | 1/2002 | Williams ..................... | 714/43 |
| 2002/0026604 A1 | * | 2/2002 | Bissett et al. ................ | 714/12 |
| 2002/0144177 A1 | * | 10/2002 | Kondo et al. ................ | 714/13 |
| 2005/0050410 A1 | * | 3/2005 | Pomaranski et al. ........ | 714/723 |
| 2005/0060603 A1 | * | 3/2005 | Pomaranski et al. ......... | 714/7 |
| 2005/0235166 A1 | * | 10/2005 | England et al. ............. | 713/193 |
| 2005/0246568 A1 | * | 11/2005 | Davies ......................... | 714/2 |
| 2006/0107116 A1 | * | 5/2006 | Michaelis et al. ........... | 714/25 |
| 2006/0248384 A1 | * | 11/2006 | Safford ........................ | 714/11 |

* cited by examiner

*Primary Examiner*—Bryce P Bonzo
(74) *Attorney, Agent, or Firm*—Dan Shifrin

(57) ABSTRACT

An error handling method is provided for processing adapter errors. Rather than executing a disruptive controller hardware reset, an error handling routine provides instructions for a reset operation to be loaded and executed from cache while the SDRAM is in self-refresh mode and therefore unusable.

18 Claims, 1 Drawing Sheet

MANAGEMENT OF MEMORY CONTROLLER RESET

TECHNICAL FIELD

The present invention relates generally to storage controllers and, in particular, to managing system resets caused by host adapter errors.

BACKGROUND ART

A large-scale computing system generally includes a storage controller, such as the IBM® Enterprise Storage Server®, which processes input/output (I/O) commands from one or more host devices, such as an IBM S/390®, to write data to or read data from one or more storage devices, such as hard disk arrays, storage libraries or the like. Such controllers include error handling routines to process errors in the various I/O adapters through which external devices, such as hosts, servers and storage devices are attached to the storage controller. Although many errors may be "cleared" by resetting error registers in various components within the controller, there are many other types of errors which require a hardware reset in order to recover from the error.

As will be appreciated, a hardware reset is time consuming and very disruptive to host operations. In a typical prior art recovery process, directed by an error handler, microprocessor code must be reloaded and built-in self-tests and power-on self-tests must be run before registers may be initialized. Moreover, global structures which are shared and exchanged with other processors must be updated.

Consequently, a need exists for a less disruptive error recovery process in a device such as a storage controller.

SUMMARY OF THE INVENTION

The present invention provides methods, systems, computer program products and methods for deploying computing infrastructure for processing adapter errors. Rather than executing a disruptive controller hardware reset, an error handling routine provides instructions for a reset operation to be loaded and executed from cache while the SDRAM is in self-refresh mode and therefore unusable.

DETAILED DESCRIPTION OF THE PREFERRED EMBODIMENT

Figure 1:
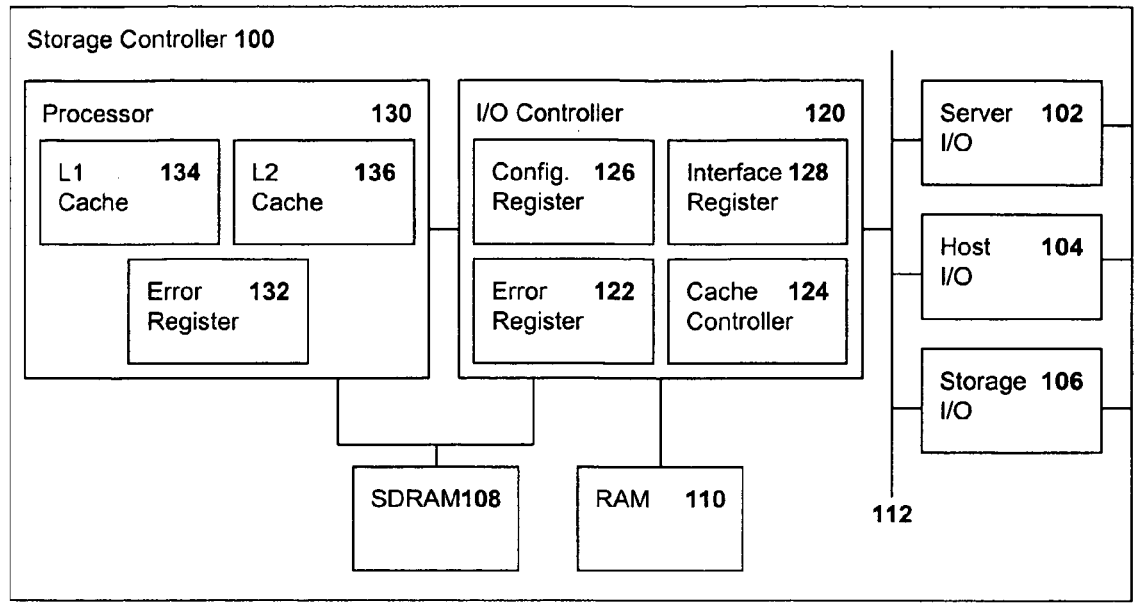
FIG. 1 is a block diagram of a storage controller in which the present invention may be implemented.

FIG. 1 is a block diagram of a storage controller 100 in which the present invention may be implemented. Although the present invention is described in terms of a storage controller, it is equally applicable to other devices which include error handing routines. The controller 100 includes, among other components, a memory controller 120 to which are attached, directly or through a bus 112, servers, hosts and storage devices through I/O adapters 102, 104 and 106, respectively. A microprocessor 130 is also coupled to the memory controller 120. A memory device, such as an SDRAM 108 is shared by the memory controller 120 and processor 130. Another memory device, such as a RAM 110, is coupled to the memory controller 120. As used herein, the term "coupled" may refer to an indirect relationship in which two components may be separated by one or more intermediary components, whereby a signal may pass through and be processed or altered by the intermediary component(s), as well as to a direct electrical connection between two components, whereby a signal passes directly from one to the other.

The memory controller 120 includes, among other components, an error register 122 and a cache controller 124. The processor 130 includes, among other components, an error register 132 and an L1 cache 134. An L2 cache 136 may be on-board, as illustrated, or external to the processor 130.

Figure 2:
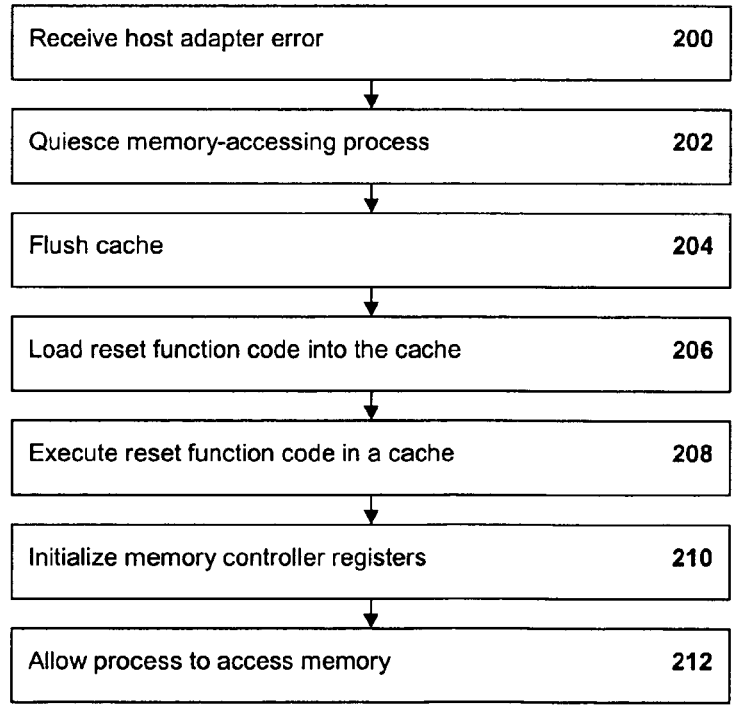
FIG. 2 is a flow chart of a process of the present invention.

Referring also to the flow chart of FIG. 2, an implementation of the present invention will be described. When an error is received (step 200), such as from the host adapter 104, the processor 130 directs the execution of error handling instructions to prepare the memory controller 120 for a reset. All processes which are using the memory controller 120 are quiesced (step 202) to prevent the SDRAM 108 from being accessed during the process. Next, the L2 cache 136 is flushed (step 204), such as by reading dummy data into the cache 136. The L1 cache may be similarly flushed. Reset function code is then loaded into the L2 cache 136 by reading in the reset instructions while the L1 and L2 caches 134 and 136 remain enabled (step 206). The reset function code is then executed by the processor 130 from the L2 cache 136 rather than from the SDRAM 108 while the external processes remain quiesced.

Simultaneously, the SDRAM 108 performs its internal refresh operation. Upon completion of the refresh, reset function code directs that the configuration and interface registers 126 and 128 in the memory controller 120 be refreshed or initialized (step 210). Finally, when the configuration and interface registers 126 and 128 and SDRAM 108 are initialized, processes are released and allowed to access the SDRAM in accordance with normal operations (step 212).

It is also no longer necessary to run the power-on self-tests or built-in self-tests. Consequently, disruptions to host operations are significantly reduced and normal I/O operations may resume more quickly.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to an apparatus, the need in the art may also be met by a method of managing memory controller reset, a computer program product containing instructions for managing memory controller reset, or a method for deploying computing infrastructure comprising integrating computer readable code into a computing system for managing memory controller reset.

What is claimed is:

1. A method for processing an error in an I/O adapter associated with a storage controller, comprising:
   receiving an adapter error in a memory controller to which a first memory device is coupled;
   quiescing processes requiring access to the first memory device;
   executing reset function code in a cache associated with the memory controller;
   initializing memory controller registers; and
   allowing processes to access the first memory device.

2. The method of claim 1, further comprising, prior to executing the reset code:
   flushing contents of the cache; and
   loading the reset function code into the cache from a second memory device coupled to the memory controller.

3. The method of claim 2, wherein the second memory device comprises a RAM device.

4. The method of claim 1, wherein the cache comprises L2 cache.

5. The method of claim 1, wherein the first memory device comprises an SDRAM device.

6. The method of claim 1, wherein the adapter comprises a host adapter.

7. An adapter error handler, comprising:
   a processor;
   a memory controller coupled to the processor;
   a first memory device coupled to the memory controller;
   a second memory device coupled to the memory controller;
   a cache associated with the microprocessor coupled to the memory controller; and
   an error register associated with the memory controller adapted to store an indication of an error in an adapter coupled to the memory controller;
   the processor programmed to, upon receipt by the memory controller of the indication of an error in the adapter, execute instructions to:
   prevent external access to the first memory device;
   flush the cache;
   cause reset function code to execute in the cache, whereby registers associated with the memory controller are initialized; and
   permit external access to the first memory device.

8. The adapter error handler of claim 7, further comprising a second memory device coupled to the memory controller.

9. The error handler of claim 8, the processor further programmed to:
   flush contents of the cache; and
   load the reset function code from the second memory device into the cache.

10. The adapter error handler of claim 8, wherein the second memory device comprises a RAM device.

11. The adapter error handler of claim 7, wherein the cache comprises L2 cache.

12. The adapter error handler of claim 7, wherein the first memory device comprises an SDRAM device.

13. The adapter error handler of claim 7, wherein the adapter comprises a host adapter.

14. A computer program product of a computer readable medium usable with a programmable computer, the computer program product having computer-readable code embodied therein for processing an error in an adapter associated with a storage controller, comprising, the computer-readable code comprising instructions for:
   receiving an adapter error in a memory controller to which is coupled a first memory device;
   quiescing processes requiring access to the first memory device;
   executing reset function code in a cache associated with the memory controller;
   initializing memory controller registers; and
   allowing processes to access the first memory device.

15. The program product of claim 14, the instructions further comprising, prior to the instruction for executing the reset code, instructions for:
   flushing contents of the cache; and
   copying the reset function code into the cache from a second memory device coupled to the memory controller.

16. The program product of claim 15, wherein the second memory device comprises a RAM device.

17. The program product of claim 14, wherein the cache comprises L2 cache.

18. The program product of claim 14, wherein the first memory device comprises an SDRAM device.

* * * * *